(12) United States Patent
Santoso et al.

(10) Patent No.: US 7,792,627 B1
(45) Date of Patent: Sep. 7, 2010

(54) HYBRID VEHICLE EXHAUST CONTROL STRATEGY

(75) Inventors: Halim G. Santoso, Novi, MI (US);
Eugene V. Gonze, Pinckney, MI (US);
Bryan Nathaniel Roos, Novi, MI (US);
Brian Spohn, Holly, MI (US)

(73) Assignee: GM Global Technology Operations, Inc.

( * ) Notice: Subject to any disclaimer, the term of this patent is extended or adjusted under 35 U.S.C. 154(b) by 0 days.

(21) Appl. No.: 12/423,409

(22) Filed: Apr. 14, 2009

(51) Int. Cl.
*F01N 3/30* (2006.01)
*F02D 41/26* (2006.01)

(52) U.S. Cl. .................. 701/102; 123/142.5 R; 123/676; 60/303; 180/65.21

(58) Field of Classification Search ......... 701/102–103; 60/300, 303; 180/65.21; 123/672, 676, 697, 123/481, 142.5 R, 443

See application file for complete search history.

(56) References Cited

U.S. PATENT DOCUMENTS

| | | | | |
|---|---|---|---|---|
| 5,345,761 A | * | 9/1994 | King et al. .............. | 60/274 |
| 5,689,952 A | * | 11/1997 | Kato et al. .............. | 60/277 |
| 5,791,140 A | * | 8/1998 | Shimasaki et al. ...... | 60/284 |
| 6,131,538 A | * | 10/2000 | Kanai ..................... | 123/2 |
| 6,167,696 B1 | * | 1/2001 | Maaseidvaag et al. .. | 60/274 |
| 2008/0282673 A1 | * | 11/2008 | Gonze et al. ........... | 60/284 |

* cited by examiner

*Primary Examiner*—Hai H Huynh

(57) ABSTRACT

An emissions control method may include operating a hybrid vehicle in a first mode during which a combustion engine is off and an electric motor powers propulsion of the vehicle. An electrically heated catalyst (EHC) may be energized during the first mode. The method may further include determining an operating temperature of an additional catalyst in communication with exhaust gas from the combustion engine and operating the vehicle in a second mode after the first mode during which the engine powers propulsion of the vehicle. The engine may operate in a catalyst combustion mode during the second mode when the operating temperature is below a first predetermined limit. The catalyst combustion mode may include operating the engine at an air-fuel ratio of less than stoichiometry and injecting air into exhaust gas from the engine at a location before the additional catalyst to create an exothermic reaction within the additional catalyst.

20 Claims, 3 Drawing Sheets

HYBRID VEHICLE EXHAUST CONTROL STRATEGY

FIELD

The present disclosure relates to hybrid vehicle exhaust control strategies.

BACKGROUND

This section provides background information related to the present disclosure which is not necessarily prior art.

Hybrid vehicles may include an internal combustion engine and a hybrid power assembly. Hybrid vehicles may be operated during extended periods of time in a hybrid mode using only the hybrid power assembly. During operation in the hybrid mode, the engine may be off. When the vehicle is switched to an engine operating mode, exhaust gas exiting the engine passes through an exhaust aftertreatment system. Components of the exhaust aftertreatment system may require minimum operating temperatures for proper operation. The engine may be powered on during the hybrid mode, even when not needed for additional power output, in order to maintain the exhaust aftertreatment system at a desired operating temperature. This results in reduced fuel economy.

SUMMARY

This section provides a general summary of the disclosure, and is not a comprehensive disclosure of its full scope or all of its features.

An emissions control method may include operating a hybrid vehicle in a first mode during which a combustion engine is off and an electric motor powers propulsion of the vehicle. An electrically heated catalyst (EHC) may be energized during the first mode. The method may further include determining an operating temperature of an additional catalyst in communication with exhaust gas from the combustion engine and operating the vehicle in a second mode after the first mode during which the engine powers propulsion of the vehicle. The engine may operate in a catalyst combustion mode during the second mode when the operating temperature is below a first predetermined limit. The catalyst combustion mode may include operating the engine at an air-fuel ratio of less than stoichiometry and injecting air into exhaust gas from the engine at a location before the additional catalyst to create an exothermic reaction within the additional catalyst.

A control module may include a hybrid vehicle mode control module, an EHC control module in communication with the hybrid mode control module and an electrically heated catalyst (EHC), a catalyst temperature evaluation module, and an engine combustion control module in communication with the hybrid vehicle mode control module and the catalyst temperature evaluation module. The hybrid vehicle mode control module may control vehicle operation between first and second modes. The first mode may include a combustion engine being off and an electric motor powering propulsion of the vehicle and the second mode may include the engine being operated and powering propulsion of the vehicle. The EHC control module may energize the EHC during the first mode. The catalyst temperature evaluation module may determine an operating temperature of the additional catalyst. The engine combustion control module may operate the engine in a catalyst combustion mode during the second mode when the operating temperature is below a first predetermined limit. The catalyst combustion mode may include operating the engine at an air-fuel ratio of less than stoichiometry and injecting air into exhaust gas from the engine at a location before the additional catalyst to create an exothermic reaction within the additional catalyst.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
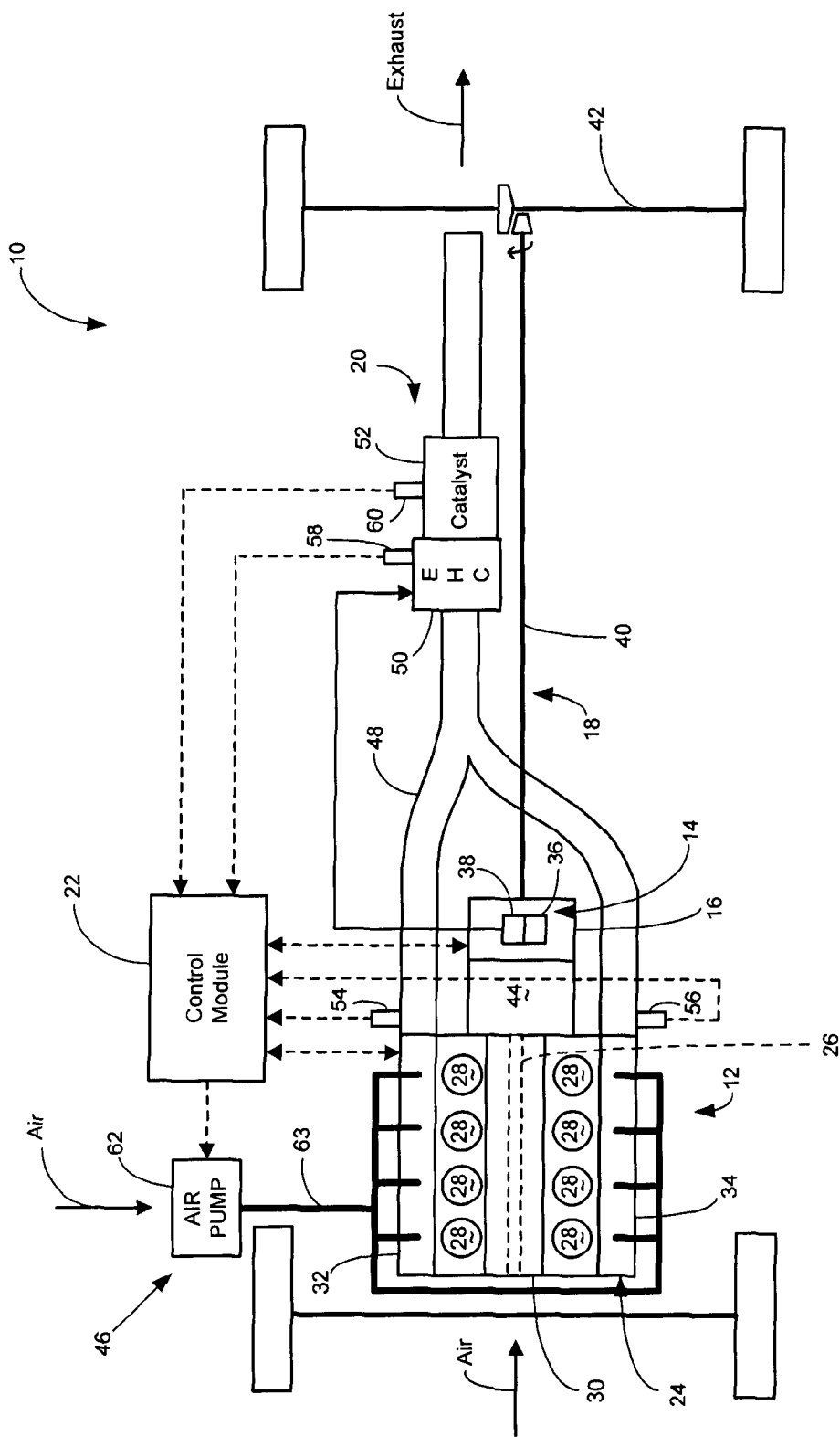
FIG. 1 is a schematic illustration of a vehicle according to the present disclosure.
Figure 2:
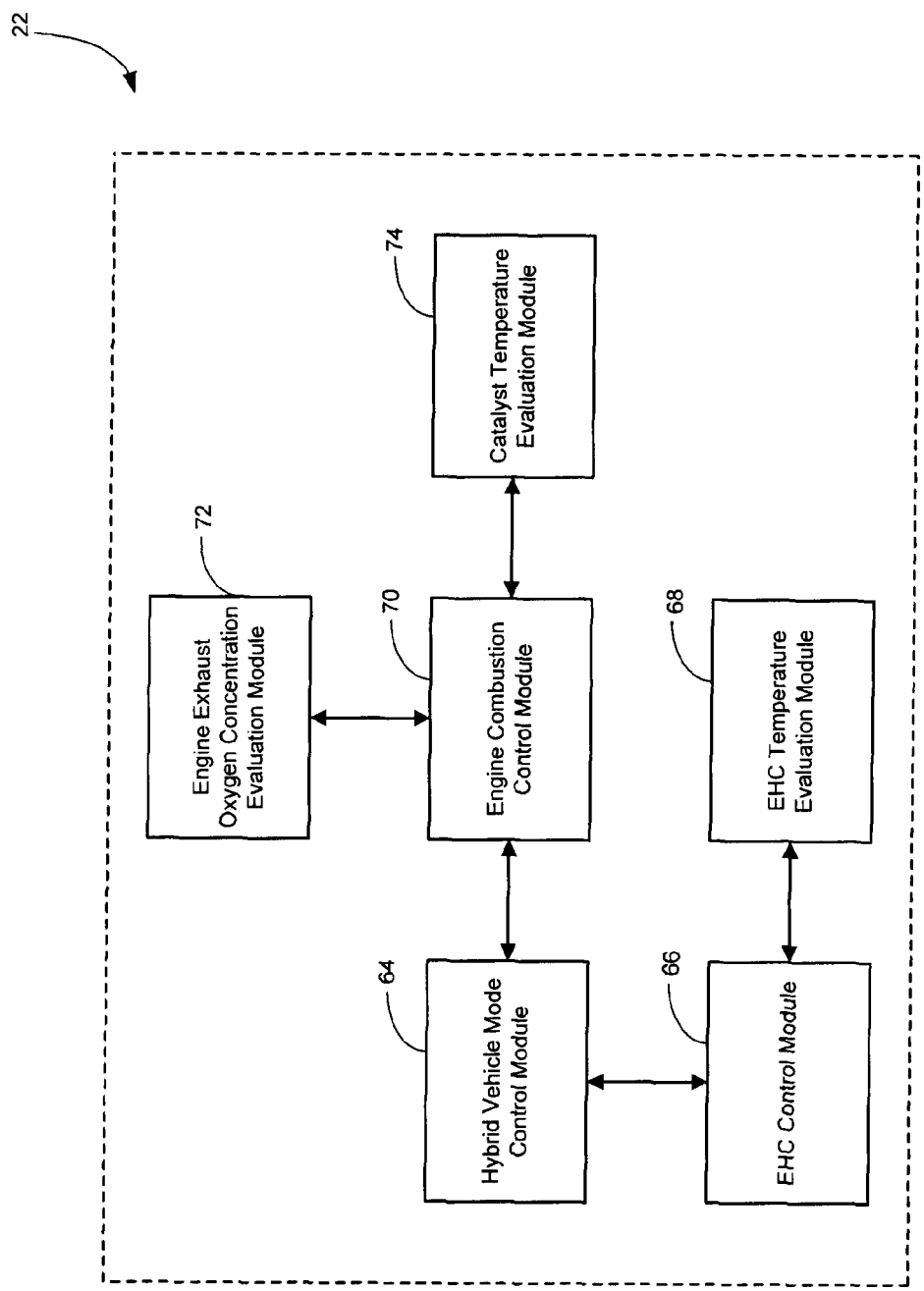
FIG. 2 is a schematic illustration of a control module of the vehicle of FIG. 1.

The following description is merely exemplary in nature and is not intended to limit the present disclosure, application, or uses. For purposes of clarity, the same reference numbers will be used in the drawings to identify similar elements. As used herein, the term "module" refers to an application specific integrated circuit (ASIC), an electronic circuit, a processor (shared, dedicated, or group) and memory that execute one or more software or firmware programs, a combinational logic circuit, or other suitable components that provide the described functionality.

Referring to FIG. 1, an exemplary vehicle 10 may include an engine assembly 12, a hybrid power assembly 14, a transmission 16, a driveline assembly 18, an exhaust assembly 20, and a control module 22. The engine assembly 12 may include an internal combustion engine 24 having a crankshaft 26 rotationally driven by pistons 28, an intake manifold 30 providing an air flow to the engine 24 and exhaust manifolds 32, 34 receiving exhaust gas exiting the engine 24.

The hybrid power assembly 14 may include an electric motor 36 and a rechargeable battery 38. The electric motor 36 and the rechargeable battery 38 may form a drive mechanism for the hybrid power assembly 14. The motor 36 may be in electrical communication with the battery 38 to convert power from the battery 38 to mechanical power. The motor 36 may additionally be powered by the engine 24 and operated as a generator to provide power to charge the battery 38. The hybrid power assembly 14 may be incorporated into and engaged with the transmission 16. Alternatively, the hybrid power assembly 14 may be external to the transmission 16.

The driveline assembly 18 may include an output shaft 40 and a drive axle 42. The motor 36 may be coupled to the output shaft 40 via the transmission 16 to power rotation of the drive axle 42. The engine 24 may be coupled to the transmission 16 via a coupling device 44. The coupling device 44 may include a friction clutch or a torque converter. The transmission 16 may use the power from the engine 24 and/or the motor 36 to drive the output shaft 40 and power rotation of the drive axle 42.

The vehicle 10 may be operable in a variety of modes depending on power requirements. In a first operating mode, the engine 24 may be decoupled from the transmission 16 and the electric motor 36 may drive the output shaft 40. In a second operating mode, the crankshaft 26 may drive the output shaft 40 through combustion within the engine 24. In the second operating mode, the engine 24 may drive the output shaft 40 by itself or in combination with the electric motor 36. In a third operating mode, the engine 24 may drive the electric motor 36 to charge the battery 38 and may drive the output shaft 40.

The exhaust assembly 20 may include an air injection assembly 46, an exhaust conduit 48, an electrically heated catalyst (EHC) 50, an additional catalyst 52, first and second oxygen sensors 54, 56 and first and second temperature sensors 58, 60. The air injection assembly 46 may include an air pump 62 and an air injection conduit 63 in fluid communication with the air pump 62 and the exhaust manifolds 32, 34. The exhaust conduit 48 may provide fluid communication between the exhaust manifolds 32, 34 and the EHC 50 and the additional catalyst 52. The EHC 50 may be located upstream of the additional catalyst 52. The EHC 50 may be powered by the battery 38. The additional catalyst 52 may include a three-way catalyst.

The first and second oxygen sensors 54, 56 may be in communication with an exhaust gas flow upstream of the EHC 50. More specifically, the first oxygen sensor 54 may be located in the exhaust conduit 48 proximate the outlet of the exhaust manifold 32 and the second oxygen sensor 56 may be located in the exhaust conduit 48 proximate the outlet of the exhaust manifold 34. The first and second oxygen sensors 54, 56 may be in communication with the control module 22 and may provide signals thereto indicative of the oxygen concentration in the exhaust gas exiting the engine 24.

The first temperature sensor 58 may be coupled to the EHC 50 and may be in communication with the control module 22, providing a signal to the control module 22 indicative of the temperature of the EHC 50. The second temperature sensor 60 may be coupled to the additional catalyst 52 and may be in communication with the control module 22. The second temperature sensor 60 may provide a signal to the control module 22 indicative of the temperature of the additional catalyst 52.

The control module 22 may additionally be in communication with the air pump 62 and the hybrid power assembly 14. The control module 22 may include a hybrid vehicle mode control module 64, an EHC control module 66, an EHC temperature evaluation module 68, an engine combustion control module 70, an engine exhaust oxygen concentration evaluation module 72, and a catalyst temperature evaluation module 74. The hybrid vehicle mode control module 64 may control operation of the vehicle in the first, second, and third operating modes discussed above, as well as switching between the operating modes.

The hybrid vehicle mode control module 64 may be in communication with the EHC control module 66. The EHC control module 66 may be in communication with the EHC temperature evaluation module 68 and may receive a signal therefrom indicating power requirements for operating the EHC at a desired temperature. The EHC temperature evaluation module 68 may receive signals from the first temperature sensor 58 indicative of the EHC operating temperature.

The hybrid vehicle mode control module 64 may be in communication with the engine combustion control module 70 and may command engine operation when needed. The engine combustion control module 70 may be in communication with the engine exhaust oxygen concentration evaluation module 72 and the catalyst temperature evaluation module 74. The engine exhaust oxygen concentration evaluation module 72 may be in communication with the first and second oxygen sensors 54, 56 and may receive signals therefrom indicative of the oxygen concentration in the exhaust gas. The engine exhaust oxygen concentration evaluation module 72 may provide a signal to the engine combustion control module 70 indicative of the oxygen concentration in the exhaust gas.

The catalyst temperature evaluation module 74 may be in communication with the second temperature sensor 60 and may receive a signal therefrom indicative of the temperature of the catalyst 52. The catalyst temperature evaluation module 74 may provide a signal to the engine combustion control module 70 indicative of the temperature of the catalyst 52. The engine combustion control module 70 may control combustion parameters and operation of the air injection assembly 46 based on the inputs from the engine exhaust oxygen concentration evaluation module 72 and the catalyst temperature evaluation module 74.

Figure 3:
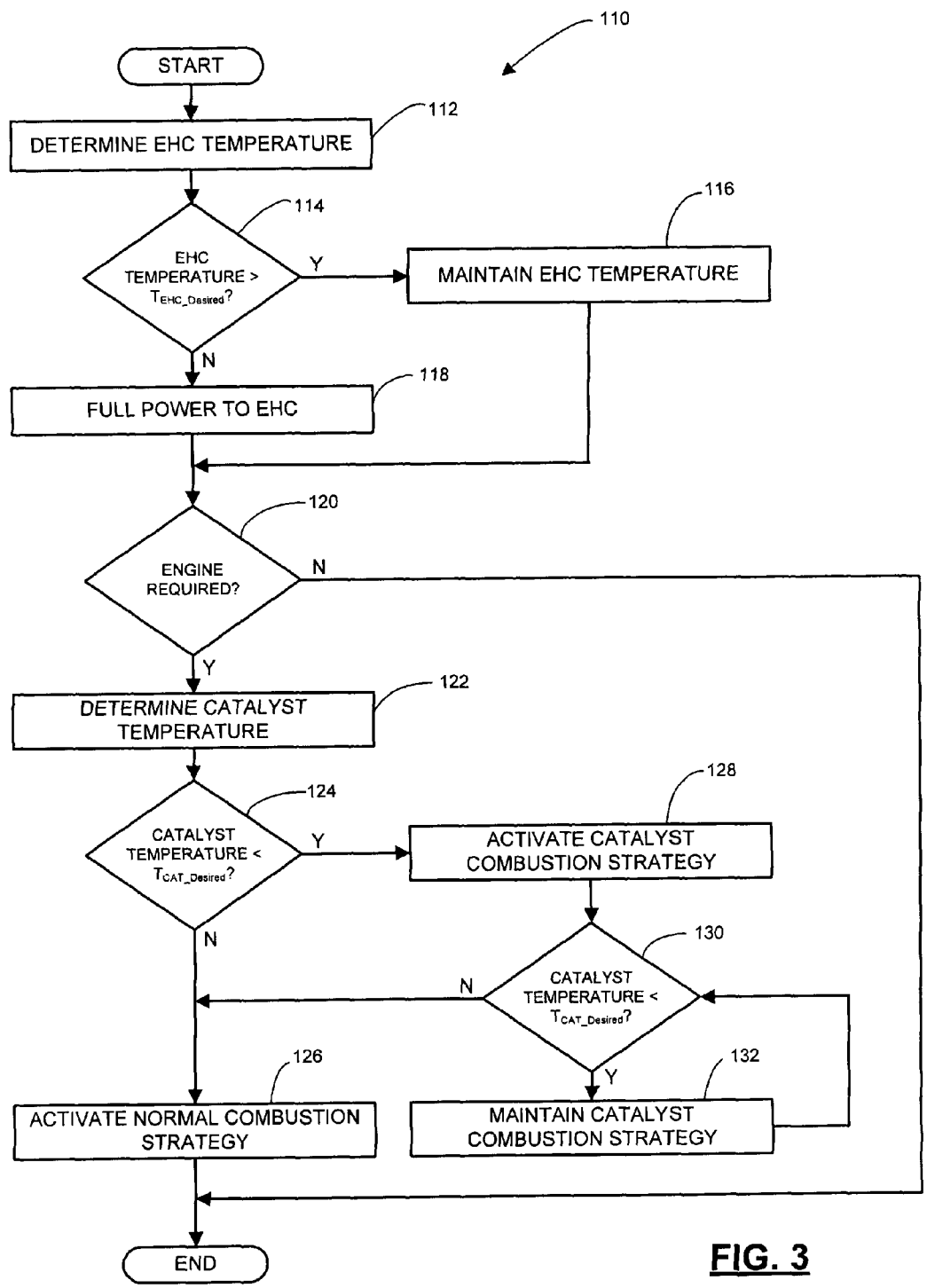
FIG. 3 is an illustration of control logic for operation of the vehicle of FIG. 1.

Control logic 110 for operation of the vehicle 10 is illustrated in FIG. 3. The hybrid vehicle mode control module 64 may initially operate the vehicle 10 in the first operating mode at start-up. Control logic 110 may begin at block 112 where the EHC temperature evaluation module 68 determines the temperature of EHC 50 during vehicle operation in the first operating mode. Control logic 110 then proceeds to block 114 where the EHC temperature is evaluated. If the EHC temperature is above a predetermined limit ($T_{EHC\,Desired}$), control logic 110 proceeds to block 116 where EHC temperature is maintained by the EHC control module 66. The predetermined limit ($T_{EHC\,Desired}$) may include a temperature where the EHC 50 maintains nominal hydrocarbon (HC) treatment efficiency, such as two hundred degrees Celsius. The temperature of the EHC 50 may be maintained by controlling the powering of the EHC 50 by the battery 38. Control logic 110 may then proceed to block 120.

If the EHC temperature is below the predetermined limit ($T_{EHC\,Desired}$), control logic 110 proceeds to block 118 where EHC temperature is increased by the EHC control module 66. The temperature of the EHC 50 may be increased by controlling the powering of the EHC 50 by the battery 38. For example, when the EHC is operating at a temperature below the predetermined limit ($T_{EHC\,Desired}$), the battery 38 may provide fully power to the EHC 50. The EHC 50 may remain powered (or energized) throughout operation in the first operating mode. Control logic 110 may then proceed to block 120, where the vehicle operating mode is evaluated by the hybrid vehicle mode control module 64. More specifically, control logic 110 determines whether engine operation is required. If engine operation is not required, control logic 110 may terminate and the vehicle may continue operation in the first operating mode. Otherwise, control logic 110 may proceed to block 122 where the temperature of the catalyst 52 is determined by the catalyst temperature evaluation module 74. The temperature of the catalyst 52 may be determined before operation of the vehicle in the second operating mode.

The catalyst temperature evaluation module 74 may then evaluate the temperature of the catalyst 52 at block 124. If the catalyst temperature is above a predetermined limit ($T_{CAT\,Desired}$), control logic 110 may proceed to block 126 where operation of the vehicle in the second operating mode is initiated by the engine combustion control module 70 using a normal combustion strategy. The predetermined temperature limit ($T_{CAT\,Desired}$) may correspond to a temperature at which the catalyst 52 is fully functional, such as at or above four hundred degrees Celsius. The normal combustion strategy may include closed loop operation of the engine using a generally stoichiometric air-fuel ratio (an air-fuel ratio of between 14.2-to-1 and 14.8-to-1). Control logic 110 may then terminate.

If the catalyst temperature is below the predetermined limit ($T_{CAT\,Desired}$), control logic 110 may proceed to block 128 where operation of the vehicle 10 in the second operating mode is initiated using a catalyst combustion strategy. The catalyst combustion strategy may include operating the engine using an air-fuel ratio that is less than stoichiometric (rich operation) to produce higher carbon monoxide (CO) and hydrocarbon (HC) content in the exhaust gas relative to stoichiometric air-fuel ratio operation. More specifically, the catalyst combustion strategy includes operating the engine at an air-fuel ratio between 8-to-1 and 14.2-to-1. The EHC 50 may be operating at or above the predetermined limit ($T_{EHC\,Desired}$) before air injection. The catalyst combustion strategy may additionally include the injection of air into the exhaust gas using the air injection assembly 46. The engine exhaust oxygen concentration evaluation module 72 may monitor the oxygen concentration in the exhaust gas exiting the engine and control the air injection assembly 46 to provide an exhaust gas stream having a desired oxygen concentration.

The introduction of oxygen into the exhaust gas stream may provide increased carbon monoxide (CO) and hydrocarbon (HC) oxidation in the catalyst 52. The carbon monoxide (CO) and hydrocarbon (HC) oxidation produces an exothermic reaction in the catalyst 52, raising the temperature of the catalyst. After the catalyst combustion strategy has run for a predetermined time, control logic 110 may proceed to block 130 where the temperature of the catalyst 52 is again evaluated.

If the catalyst temperature is below the predetermined limit ($T_{CAT\,Desired}$), control logic 110 may proceed to block 132 where engine operation is maintained in the catalyst combustion strategy. Control logic 110 may then return to block 130 where the temperature of the catalyst 52 is again evaluated. If the catalyst temperature is above the predetermined limit ($T_{CAT\,Desired}$), control logic 110 may proceed to block 126 where the normal combustion strategy is initiated. Control logic 110 may then terminate.

Control logic 110 may loop back to start again at block 112 after termination. More specifically, control logic 110 may wait a predetermined time and restart at block 112. By way of non-limiting example, the predetermined time may be at least 12.5 milliseconds (ms). Therefore, control logic 110 may run continuously during vehicle operation.

What is claimed is:

1. A method comprising:
    operating a hybrid vehicle in a first mode during which a combustion engine is off and an electric motor propels the hybrid vehicle;
    energizing an electrically heated catalyst (EHC) during the first mode;
    determining an operating temperature of an additional catalyst in communication with exhaust gas from the combustion engine; and
    operating the vehicle in a second mode after the first mode during which the engine propels the hybrid vehicle, the engine operating in a catalyst combustion mode during the second mode when the operating temperature is below a first predetermined limit, the catalyst combustion mode including operating the engine at an air-fuel ratio of less than stoichiometry and injecting air into exhaust gas from the engine at a location before the additional catalyst.

2. The method of claim 1, wherein the engine is operated at an air-fuel ratio between 14.2-to-1 and 14.8-to-1 when the operating temperature of the additional catalyst is above the first predetermined limit.

3. The method of claim 1, wherein the EHC is located upstream of the additional catalyst and heats the exhaust gas before the exhaust gas reaches the additional catalyst.

4. The method of claim 3, wherein the EHC is heated to a temperature of greater than 200 degrees Celsius during the first mode.

5. The method of claim 1, wherein the determining the operating temperature of the additional catalyst occurs before vehicle operation in the second mode.

6. The method of claim 1, wherein the EHC is energized after a vehicle start condition in the first mode and is operated at a temperature greater than a second predetermined limit before the injecting air into the exhaust gas during the catalyst combustion mode.

7. The method of claim 1, wherein the injecting air includes forcing an air flow into the exhaust gas via an air pump to control an oxygen level in the exhaust gas during the catalyst combustion mode.

8. The method of claim 1, further comprising determining an oxygen level in the exhaust gas during the operation in the catalyst combustion mode, the injecting air being controlled to provide a predetermined oxygen level within the exhaust gas to produce the exothermic reaction within the additional catalyst.

9. The method of claim 8, wherein the exhaust gas is heated by the EHC and the injecting air occurs at a location upstream of the EHC.

10. The method of claim 1, wherein the catalyst combustion mode includes operating the engine at an air-fuel ratio between 8-to-1 and 14.2-to-1.

11. A control module comprising:
    a hybrid vehicle mode control module controlling vehicle operation in a first mode during which a combustion engine is off and an electric motor propels the vehicle and in a second mode during which the engine propels the vehicle;
    an EHC control module in communication with the hybrid mode control module and an electrically heated catalyst (EHC) and energizing the EHC during the first mode;
    a catalyst temperature evaluation module determining an operating temperature of an additional catalyst; and
    an engine combustion control module in communication with the hybrid vehicle mode control module and the catalyst temperature evaluation module and operating the engine in a catalyst combustion mode during the second mode when the operating temperature is below a first predetermined limit, the catalyst combustion mode including operating the engine at an air-fuel ratio of less than stoichiometry and injecting air into exhaust gas from the engine at a location before the additional catalyst.

12. The control module of claim 11, wherein the engine combustion control module operates the engine at an air-fuel ratio between 14.2-to-1 and 14.8-to-1 when the vehicle is operated in the second mode and the operating temperature is above the first predetermined limit.

13. The control module of claim 12, wherein the EHC is located between the engine and the additional catalyst.

14. The control module of claim 13, wherein EHC control module heats the EHC to at least 200 degrees Celsius during the first operating mode.

15. The control module of claim 11, wherein the catalyst temperature evaluation module determines the operating temperature before vehicle operation in the second mode.

16. The control module of claim 11, wherein the EHC control module heats the EHC above a predetermined temperature limit before the engine combustion control module injects air into the exhaust gas.

17. The control module of claim 11, wherein the injecting air includes forcing an air flow into the exhaust gas via an air pump to control an oxygen level in the exhaust gas during the catalyst combustion mode.

18. The control module of claim 11, further comprising an oxygen concentration evaluation module that determines an oxygen level in the exhaust gas during operation in the catalyst combustion mode, wherein the engine combustion control module controls air injection to provide a predetermined oxygen level within the exhaust gas.

19. The control module of claim 18, wherein the exhaust gas is heated by the EHC and the injecting air occurs at a location upstream of the EHC.

20. The control module of claim 11, wherein the catalyst combustion mode includes operating the engine at an air-fuel ratio between 8-to-1 and 14.2-to-1.

* * * * *